United States Patent
Marupaduga et al.

(10) Patent No.: US 9,253,662 B1
(45) Date of Patent: Feb. 2, 2016

(54) METHOD AND SYSTEM FOR DYNAMICALLY ACTIVATING A RELAY

(71) Applicant: Sprint Spectrum L.P., Overland Park, KS (US)

(72) Inventors: Sreekar Marupaduga, Overland Park, KS (US); Maneesh Gauba, Overland Park, KS (US); Gene S. Mitchell, Blue Springs, MO (US); Stephen R. Bales, Lee's Summit, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 163 days.

(21) Appl. No.: 14/071,031

(22) Filed: Nov. 4, 2013

(51) Int. Cl.
*H04W 24/02* (2009.01)

(52) U.S. Cl.
CPC .................................... *H04W 24/02* (2013.01)

(58) Field of Classification Search
None
See application file for complete search history.

(56) References Cited

U.S. PATENT DOCUMENTS

| 8,787,245 | B2* | 7/2014 | Seo et al. ................. 370/315 |
| 9,026,122 | B2* | 5/2015 | Waz-Ambrozewicz et al. ................. 455/452.1 |
| 2009/0196177 | A1* | 8/2009 | Teyeb et al. ................. 370/231 |
| 2010/0278141 | A1* | 11/2010 | Choi-Grogan et al. ........ 370/331 |
| 2010/0322145 | A1* | 12/2010 | Yu et al. ................. 370/315 |
| 2010/0325506 | A1* | 12/2010 | Cai et al. ................. 714/748 |
| 2010/0329216 | A1* | 12/2010 | Jen ................. 370/332 |
| 2011/0081903 | A1* | 4/2011 | Cai et al. ................. 455/424 |
| 2011/0211467 | A1* | 9/2011 | Bhat ................. 370/252 |
| 2012/0170508 | A1* | 7/2012 | Sawai ................. 370/315 |
| 2013/0279346 | A1* | 10/2013 | Zhang ................. 370/241.1 |
| 2014/0269417 | A1* | 9/2014 | Yu et al. ................. 370/254 |

\* cited by examiner

*Primary Examiner* — Donald Mills (57) ABSTRACT

Disclosed is a method and corresponding system for dynamically activating a relay in a radio access network (RAN) that includes a plurality of base stations. Each base station may radiate to define one or more respective wireless coverage areas, and each coverage area may operate on one or more carrier frequencies. The RAN may be arranged to receive, from a user equipment device (UE) that is being served by a base station of the RAN on a first carrier frequency, a report indicating threshold low wireless performance on the first carrier frequency. In response to the report indicating threshold low wireless performance, the RAN may be arranged to then activate a relay that functions to communicate with the base station over a relay backhaul interface, and communicate with the UE on a second carrier frequency that is different from the first carrier frequency.

20 Claims, 5 Drawing Sheets

METHOD AND SYSTEM FOR DYNAMICALLY ACTIVATING A RELAY

BACKGROUND

Unless otherwise indicated herein, the materials described in this section are not prior art to the claims and are not admitted to be prior art by inclusion in this section.

To provide cellular wireless communication service, a wireless service provider or "wireless carrier" typically operates a radio access network (RAN) that includes a number of base stations that radiate to define wireless coverage areas, such as cells and cell sectors, in which user equipment devices (UEs) (also known as wireless communication devices (WCDs)) such as cell phones, tablet computers, tracking devices, embedded wireless modules, and other wirelessly equipped communication devices, can operate. In turn, each base station may be coupled with network infrastructure that provides connectivity with one or more transport networks, such as the public switched telephone network (PSTN) and/or the Internet for instance. With this arrangement, a UE within coverage of the RAN may engage in air interface communication with a base station and may thereby communicate via the base station with various remote network entities or with other UEs served by the base station.

In general, a RAN may operate in accordance with a particular air interface protocol or "radio access technology," with communications from the base stations to UEs defining a downlink or forward link and communications from the UEs to the base stations defining an uplink or reverse link. Examples of existing air interface protocols include, without limitation, Orthogonal Frequency Division Multiple Access (OFDMA (e.g., Long Term Evolution (LTE) or Wireless Interoperability for Microwave Access (WiMAX)), Code Division Multiple Access (CDMA) (e.g., 1xRTT and 1xEV-DO), and Global System for Mobile Communications (GSM), among others. Each protocol may define its own procedures for registration of UEs, initiation of communications, handoff between coverage areas, and functions related to air interface communication.

In accordance with the air interface protocol, each coverage area may operate on one or more carrier frequencies or blocks of frequencies (e.g., frequency bands, such as 698-960 MHz, 1610-2025 MHz, etc.) and may define a number of air interface channels for carrying information between the base station and UEs. These channels may be defined in various ways, such as through frequency division multiplexing, time division multiplexing, and/or code-division multiplexing, for instance. By way of example, each coverage area may define a pilot channel, reference channel, or other resource on which the base station may broadcast a pilot signal, reference signal, or the like that UEs may detect as an indication of coverage and may measure to evaluate coverage strength. As another example, each coverage area may define one or more uplink control channels or other resources on which UEs may transmit control messages to the base station. And each coverage area may define one or more downlink control channels or other resources on which the base station may transmit control messages or other information to UEs. Each coverage area may then define one or more traffic channels or other resource for carrying communication traffic such as voice data and other data between the base station and UEs.

When a UE first powers on or enters into coverage of the RAN and seeks to connect to a coverage area of the RAN, the UE may scan the pilot or reference signals of the RAN's coverage areas in an effort to determine a signal strength of each respective pilot or reference signal. The UE may then identify, for example, a coverage area with a strongest pilot or reference signal (e.g., having the highest signal-to-noise ratio) and may register with that coverage area by transmitting a registration request or attach request to a base station providing that signal and serving that coverage area. This registration process may serve to notify the RAN of the UE's presence in a particular coverage area and to facilitate network authentication of the UE. Once registered in that coverage area, the UE may then be served by the RAN in that coverage area in an "idle" mode in which the UE regularly scans for page messages and other overhead information from the RAN. Further, the UE may engage in additional signaling with the RAN in order to be served by the RAN in an "active" or "connected" mode in which the UE may then engage in bearer communication.

While a UE is served by a RAN in the idle or active/connected mode, the UE may also continue to scan the airwaves to help ensure that the UE continues to operate with the most optimal coverage. For instance, while operating on a particular carrier frequency in the UE's serving coverage area, the UE may continue to monitor the pilot signal or reference signals of that coverage area as well as the pilot signal or reference signals of adjacent coverage areas, and may at some point transmit to the serving base station or RAN a report indicating the strength of the monitored signals. For example, in an LTE system, the UE may transmit a radio measurement report to the RAN. After the RAN receives the report, the RAN may then use the report to provide the UE with preferable coverage. For instance, if the report indicates threshold low signal strength on the particular carrier frequency, the RAN may direct the UE to scan for coverage on one or more other carrier frequencies, such as another carrier frequency in the UE's serving coverage area or a carrier frequency in an adjacent coverage area. The RAN may then direct the UE to hand off to a given carrier frequency of the one or more other carrier frequencies so as to operate on the given carrier frequency.

In practice, the base stations of the RAN may not always provide seamless coverage throughout a region. As such, some network arrangements may include one or more wireless relays that extend the range of a base station's coverage area so as to partially or completely fill gaps in coverage and help improve service quality. A relay may be configured with a wireless backhaul interface for communicating with a base station in much the same way a UE does, and a wireless access interface for communicating with and serving one or more UEs in much the same way that a base station does. Further, the relay may include control logic for actively bridging the backhaul communications with the access communications. The relay may thus receive and recover downlink communications from the base station and transmit those communications to the UEs, and receive and recover uplink communications from UEs and transmit those communications to the base station. Advantageously, a relay like this can have a relatively small form factor, with antenna height lower than the base station and with reduced transmit power requirements.

Overview

As noted above, when a UE is being served by a base station of the RAN on a particular carrier frequency (or frequency band), the UE may report threshold low wireless performance (e.g., coverage strength, signal strength, signal-to-noise ratio, etc.) on the particular carrier frequency. In some scenarios, for example, the threshold low wireless performance may be caused by the UE receiving interfering communications from another base station over the same particular carrier frequency. In these scenarios as well as other scenarios where the UE reports threshold low wireless performance, it may be advantageous for the RAN (e.g., the UE's serving base station) to take action to reduce that interference or otherwise provide the UE with sufficiently stronger wireless performance.

Accordingly, disclosed is a method and corresponding system for the RAN to dynamically activate a relay in response to the UE reporting threshold low wireless performance (also referred to herein as "air interface performance"). As a result of the activation, the relay may receive and recover downlink communications from the UE's serving base station over a relay backhaul interface, and transmit those communications to the UE on another carrier frequency that is different from the particular carrier frequency, thereby possibly reducing downlink interference from another base station on the particular carrier frequency or generally providing the UE with sufficiently stronger downlink wireless performance. Likewise, the relay may receive and recover uplink communications from the UE on the other carrier frequency, and transmit those communications to the UE's serving base station over the relay backhaul interface, thereby possibly reducing uplink interference from another base station on the particular carrier frequency or generally providing the UE with sufficiently stronger uplink wireless performance.

One embodiment takes the form of a method to be carried out by a RAN that includes a plurality of base stations that radiate to define respective wireless coverage areas, each wireless coverage area operating on one or more carrier frequencies. The method involves the RAN receiving, from the UE that is being served by a base station of the RAN on a first carrier frequency, a report indicating threshold low wireless performance on the first carrier frequency. The method further involves, responsive to the report indicating threshold low wireless performance, the RAN activating a relay that functions to (i) communicate with the base station over a relay backhaul interface, and (ii) communicate with the UE on a second carrier frequency that is different from the first carrier frequency.

Another embodiment takes the form of a base station configured to dynamically activate a relay in response to a given UE being served by the base station reporting threshold low air interface performance. The base station comprises an antenna structure configured to communicate over an air interface with UEs served by the base station. The base station further comprises a controller that is configured to receive, via the antenna structure from the given UE that is being served by the base station on a first carrier frequency over the air interface, a report indicating threshold low air interface performance on the first carrier frequency. The controller is further configured to respond to the report indicating threshold low air interface performance by activating a relay that functions to (i) communicate with the base station over a relay backhaul interface, and (ii) communicate with the UE over a relay access interface on a second carrier frequency that is different from the first carrier frequency.

Yet another embodiment takes the form of a non-transitory computer-readable medium having stored thereon program instructions executable by a processing unit of a RAN to cause the RAN to perform functions, the RAN including a plurality of base stations that radiate to define respective wireless coverage areas, each wireless coverage area operating on one or more carrier frequencies. The functions include receiving, from a UE that is being served by a base station of the RAN on a first carrier frequency, a report indicative of threshold low wireless performance on the first carrier frequency. Further, the functions include, in response to the report indicating threshold low wireless performance, activating a relay that functions to (i) communicate with the base station over a relay backhaul interface, and (ii) serve the UE on a second carrier frequency that is different from the first carrier frequency.

This overview is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

The present method and system will now be described with reference to the figures. It should be understood, however, that numerous variations from the depicted arrangements and functions are possible while remaining within the scope and spirit of the claims. For instance, one or more elements may be added, removed, combined, distributed, substituted, re-positioned, re-ordered, and/or otherwise changed. Further, where this description refers to one or more functions being implemented on and/or by one or more devices, one or more machines, and/or one or more networks, it should be understood that one or more of such entities could carry out one or more of such functions by themselves or in cooperation, and may do so by application of any suitable combination of hardware, firmware, and/or software. For instance, one or more processors may execute one or more sets of programming instructions as at least part of carrying out one or more of the functions described herein.

Referring to the drawings, as noted above, FIG. 1 is a simplified block diagram of an example communication system 100 in which the present method can be implemented. As shown, the example system 100 includes a RAN 102 having one or more base stations 104 (e.g., base transceiver stations (BTSs), access nodes, node-Bs, eNodeBs (eNBs), or the like) that radiate to define a number of coverage areas, where each coverage area is operating on one or more carrier frequencies or blocks of frequencies. Further, the RAN 102 then includes supporting infrastructure 106, such as a base station controller, radio network controller, mobility management entity, mobile switching center, and/or gateway, which may function to control aspects of base station operation and/or to provide connectivity with one or more transport networks 108 such as the PSTN and/or the Internet.

Figure 1:
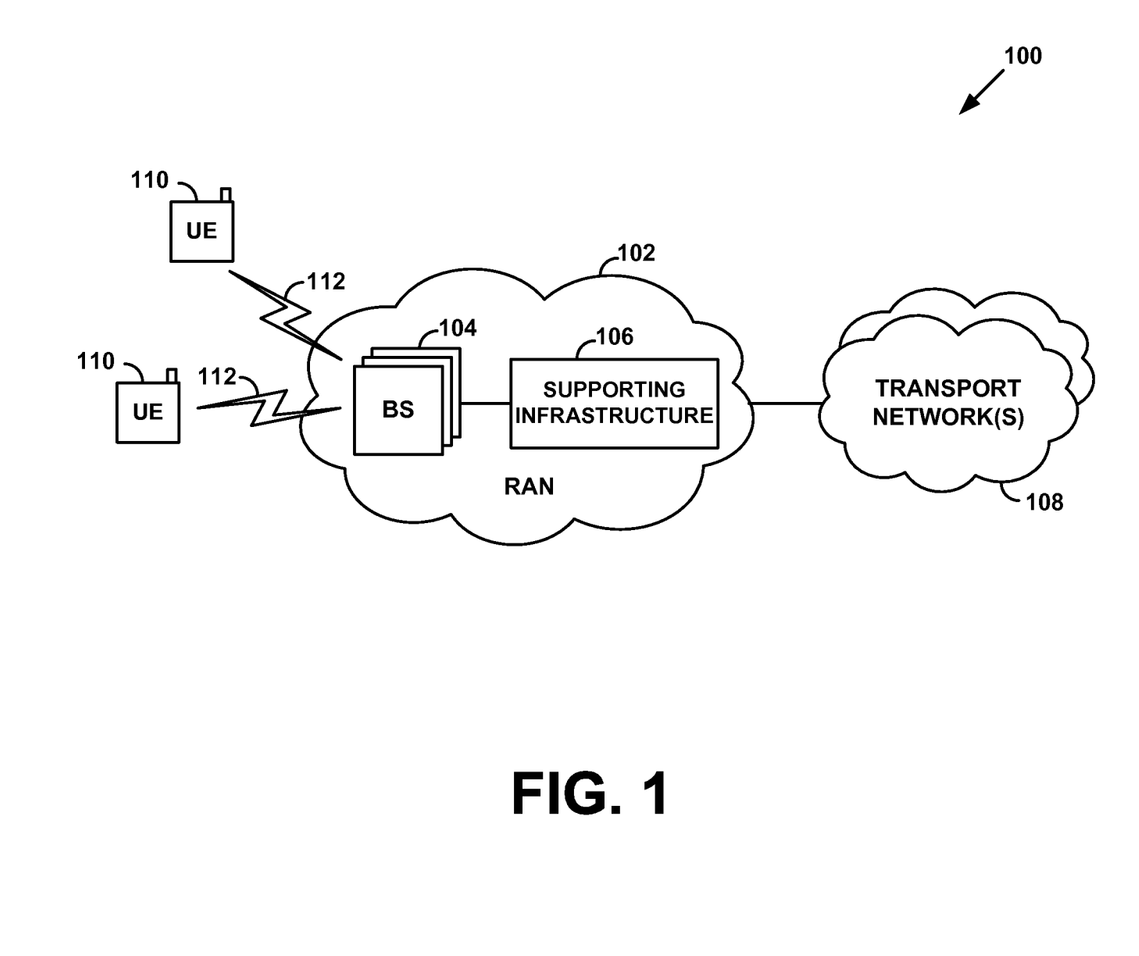
FIG. 1 is a simplified block diagram of an example communication system in which the present method can be implemented.

FIG. 1 further illustrates various representative UEs 110 located within coverage of the RAN 102 and being served by the one or more base stations 104 over respective air interfaces 112. Each of the one or more UEs 110 may be any device that is equipped to engage in wireless communication with the RAN 102 and to carry out various UE functions described herein. By way of example, a given UE may be a cell phone, or a wirelessly-equipped tablet, computer, tracking device, appliance, embedded wireless module, or other wirelessly-equipped device of a type now known or later developed.

In line with the discussion above, a given UE of the one or more UEs may operate on (i.e., be served on) a particular carrier frequency (or frequency block) in the coverage area. While operating on the particular carrier frequency, the UE may be configured to regularly (or in response to various directives and/or trigger conditions) receive, scan, and evaluate the pilot or reference signal broadcast by its serving base station or other base stations on the particular carrier frequency in order to measure wireless performance (i.e., coverage strength) on the particular carrier frequency. The UE may also be configured to regularly receive, scan, and evaluate the pilot or reference signal broadcast by its serving base station or other base stations on other carrier frequencies in order to measure wireless performance on the other carrier frequencies and facilitate possible handoff to one of the other carrier frequencies. The UE's measurement of wireless performance may involve a measurement of a signal strength, a signal/channel quality (e.g., a signal-to-noise ratio), and/or another metric of signal performance of the pilot or reference signal. From time to time, the UE may transmit to its serving base station a radio frequency measurement report that specifies the measured wireless performance on the particular carrier frequency and perhaps the measured wireless performance on other carrier frequencies.

Figure 2:
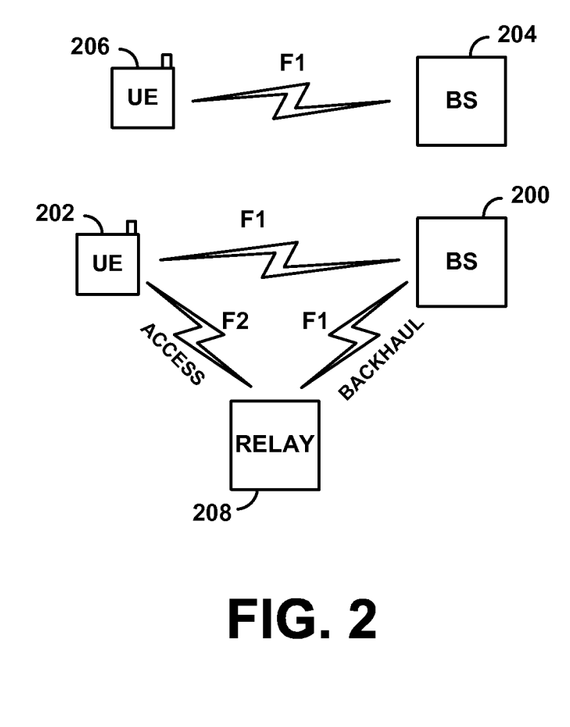
FIG. 2 is a block diagram of an example scenario in which the present method can be implemented.

FIG. 2 illustrates an example scenario in which the UE may measure and report threshold low wireless performance on the particular carrier frequency. As shown in FIG. 2, a given base station 200 may serve a UE 202 on carrier frequency F1. Further, another base station 204 may serve another UE 206 on the same carrier frequency, F1.

When two coverage areas operate on the same frequency as each other, communications in one coverage area may interfere with communications in the other coverage area. In particular, with the arrangement shown, as the UE 202 engages in uplink or downlink communication on F1 in its serving coverage area, concurrent uplink or downlink communications on F1 between the other base station 204 and the other UE 206 in the other base station's respective coverage area may interfere with receipt and processing of the communications to or from the UE 202. In other arrangements, however, concurrent uplink or downlink communications on F1 between the given base station 200 (i.e., the UE's serving base station) and another UE may also cause such interference. In either arrangement, this interference may cause the UE 202 to measure threshold low wireless performance on F1, and upon measuring the threshold low wireless performance on F1, the UE 202 may then transmit to the given base station 200 a radio frequency measurement report indicating the threshold low wireless performance.

As noted above, in this and other scenarios where the UE 202 (or perhaps a threshold number of such UEs) measures threshold low wireless performance on F1, it may be advantageous for the given base station 200 to take action to reduce that interference or otherwise help provide the UE 202 with sufficiently stronger wireless performance. To facilitate this in practice, in accordance with the present method, the given base station 200 may receive the radio frequency measurement report from the UE 202, and in response to the report indicating threshold low wireless performance, may activate a relay 208 to help provide the UE 202 with sufficiently stronger wireless performance. The activated relay 208, configured with a backhaul interface and an access interface as noted above, may then communicate with the given base station 200 over the backhaul interface on F1, and serve the UE 202 over the access interface on a different carrier frequency that may have greater wireless performance than F1, such as carrier frequency F2.

Figure 3:
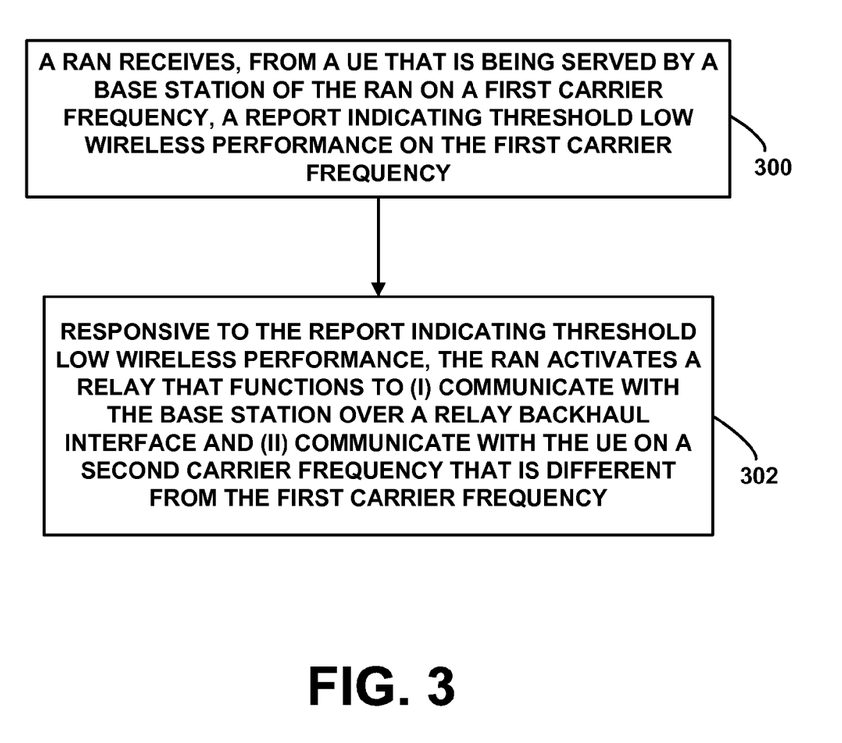
FIG. 3 is a flow chart depicting functions that can be carried out in accordance with the present method.

FIG. 3 is next a flow chart depicting functions that can be carried out in accordance with the present method. For the sake of example, the present method will be assumed to be carried out by a RAN (e.g., a base station or other RAN entity) with respect to the network arrangements illustrated in FIG. 1 and FIG. 2. It should be understood, however, that in other examples, the present method may also be carried out with respect to other network arrangements. Further, the present method may include one or more operations, functions, or actions as illustrated by blocks 300-302.

At block 300, the method involves the RAN receiving, from a UE that is being served by a base station of the RAN on a first carrier frequency, a report indicating threshold low wireless performance on the first carrier frequency. The method then involves, at block 302, responsive to the report indicating threshold low wireless performance, the RAN activating a relay that functions to (i) communicate with the base station over a relay backhaul interface and (ii) communicate with the UE on a second carrier frequency that is different from the first carrier frequency. That is, the RAN may responsively cause the relay to so function.

The process of activating the relay may take various forms. For instance, in practice, one or more relays may be served by the RAN in an inactive (i.e., "idle") mode in which each relay periodically scans for page messages and other overhead information from the RAN. The RAN may have stored a list of the one or more inactive relays, and may also have stored data (e.g., in tabular form with the list) that specifies a geographic location of each inactive relay on the list. As such, the process may involve activating a relay based on its location with respect to the location of the UE.

To facilitate this, the RAN may determine a location of the UE. By way of example, the UE may determine its own location (e.g., by way of satellite-based positioning information) and report that location to the RAN. Additionally or alternatively, the RAN may determine the UE's location using any of a variety of location-determination techniques, such as triangulation or mixed cell advanced forward link trilateration (AFLT). The RAN may then compare the location of each inactive relay with the location of the UE, and based on the comparison, the RAN may select a relay to activate. For instance, the RAN may select the relay that is closest in proximity to the UE's location.

After selecting a relay to activate, the RAN may engage in a process of selecting a carrier frequency for the relay's access interface (i.e., an access interface frequency). To facilitate this, the RAN may use the carrier frequency on which the UE is currently being served by its serving base station as a basis for determining which carrier frequency to select as the access interface frequency. By way of example, the RAN may select a carrier frequency that is different from the carrier frequency on which the UE is currently being served by its serving base station. In practice, the UE's serving base station may operate on one or more carrier frequencies that are each different from the carrier frequency on which the base station is currently serving the UE. As such, the base station may select a particular carrier frequency from those one or more carrier frequencies to be the access interface frequency. Alternatively, the relay may operate by default on such an access interface frequency.

Likewise, after selecting a relay to activate, the RAN may also select a carrier frequency for the relay's backhaul interface (i.e., a backhaul interface frequency) that is different than the carrier frequency selected to be the access interface frequency. For instance, the RAN may select as the backhaul interface frequency the carrier frequency on which the UE is currently being served by its serving base station (e.g., F1). Alternatively, the relay may operate by default on that backhaul interface frequency.

After selecting the access interface frequency and the backhaul interface frequency, the RAN may transmit activation instructions on the downlink to the relay to direct the relay to serve the UE on the access interface frequency and to communicate with the RAN on the backhaul interface frequency or generally to begin operating. To facilitate this in practice, the activation instructions may take the form of one or more control signals, such as Radio Resource Configuration (RRC) connection reconfiguration requests, for instance, that specify the respective carrier frequencies to be used for the relay's access interface and backhaul interface. The relay may receive the activation instructions while in inactive mode, and upon receipt of the instructions the relay may responsively begin to operate on the access interface frequency and the backhaul interface frequency specified by the activation instructions. The relay may then engage in signaling with the RAN over the backhaul interface in order to be served by the RAN in an "active" or "connected" mode. Once active, the relay may then engage in bearer communication with the RAN on the backhaul interface frequency. The relay may also begin to broadcast on the access interface frequency a pilot signal, reference signal, or the like that the UE may detect as an indication of coverage of the relay.

In addition to activating the relay, the RAN may direct the UE to hand off from being served on the UE's current carrier frequency to being served on the access interface frequency. To facilitate this in practice, the RAN may transmit to the UE on the downlink an inter-frequency handoff directive designating the access interface frequency of the relay. The UE may then respond to the inter-frequency handoff directive by tuning to the access interface frequency and scanning for the pilot or reference signal. Upon detecting the pilot or reference signal, the UE may measure the pilot or reference signal to evaluate coverage strength on the access interface frequency. If the UE evaluates threshold strong coverage on the access interface frequency, the UE may transmit a registration request (e.g., an attach request) to the relay on the uplink over the relay's access interface. The relay may receive the registration request and responsively transmit the registration request to the RAN. Receipt of that registration message by the RAN (e.g., by a mobility management entity of the RAN) may then trigger a registration process that serves to notify the RAN that the UE is now being served by its serving base station via the relay. Other network configurations, protocols, and registration processes are possible as well.

If the registration process is successful, the relay may begin serving the UE on the access interface frequency. While being served by the relay, the UE may transmit uplink communications to the relay on the access interface frequency, and upon receipt of the uplink communications, the relay may then transmit those uplink communications to the RAN on the backhaul interface frequency. Likewise, the RAN may transmit downlink communications to the relay on the backhaul interface frequency, and upon receipt of the uplink communications, the relay may then transmit those downlink communications to the UE on the access interface frequency.

Figure 4:
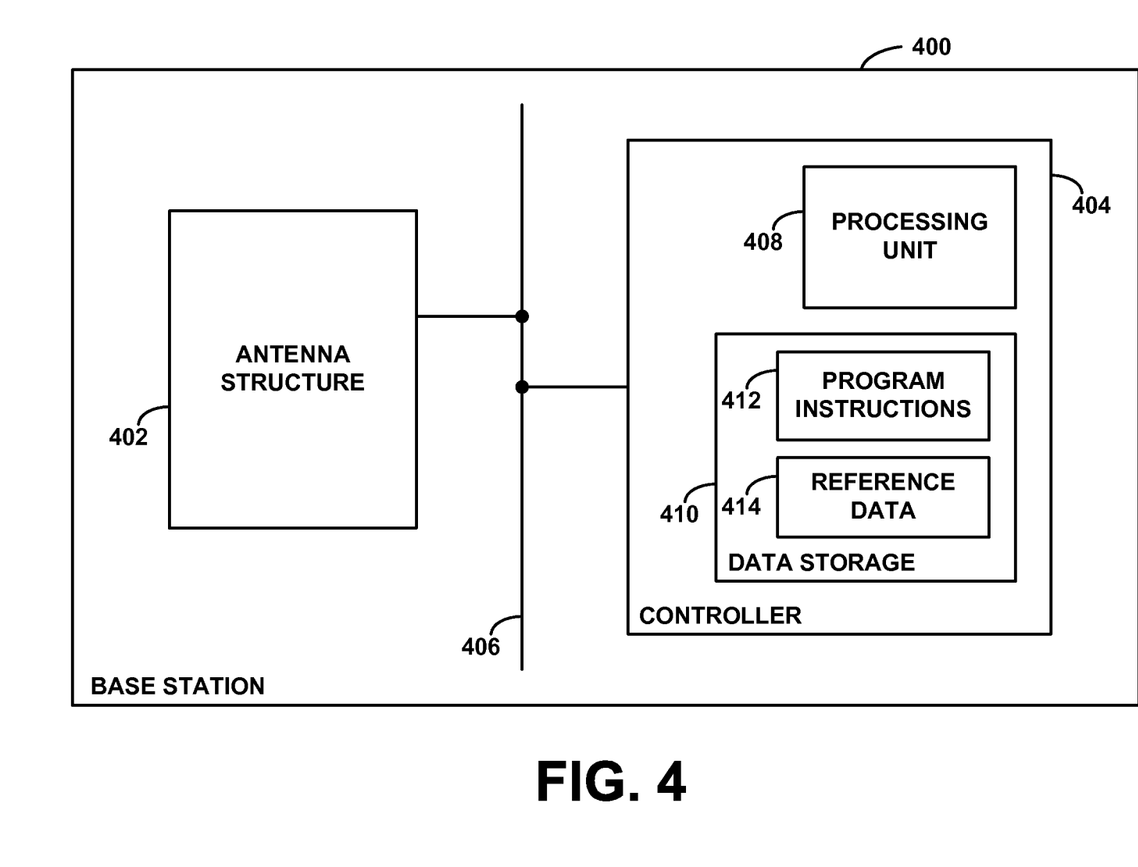
FIG. 4 is a simplified block diagram of a representative base station arranged to implement aspects of the present method.

FIG. 4 is next a simplified block diagram of a representative base station 400, such as a BTS, access node, access point, Node-B, or eNB, for instance, arranged to implement aspects of the present method. The base station 400 may take various forms, such as a macro base station (typically with antenna towers covering large public areas) or a pico/femto base station (typically taking up less space and serving much smaller areas). As shown, the base station 400 includes an antenna structure 402 and a controller 404, which may be coupled together by a system bus, network, or other connection mechanism 406.

The antenna structure 402 may comprise one or more antennas configured to radiate so as to define an air interface coverage area in which to serve one or more UEs. In some implementations, the antenna structure 402 may be arranged to communicate over a given air interface with a base station controller, and/or or other RAN entities noted above. The controller 404 may comprise a processing unit 408 and non-transitory data storage 410 (e.g., volatile and/or non-volatile storage such as magnetic, optical, or flash storage, possibly integrated in whole or in part with the processing unit 408).

The processing unit 408 may comprise one or more general purpose processors (e.g., microprocessors) and/or special-purpose processors (e.g., digital signal processors and/or application specific integrated circuits) and may be integrated in whole or in part with the antenna structure 402. The non-transitory data storage 410 may comprise one or more volatile and/or non-volatile storage components and may be integrated in whole or in part with the processing unit 408.

As shown, the non-transitory data storage 410 may hold program instructions 412, which may be executable by the processing unit 408 to carry out various base station or RAN functions described herein. For instance, in accordance with the program instructions 412, the processing unit 408 may function to activate the relay base station and to transmit to the UE, via the antenna structure 402, a handoff directive for the UE to hand off from the particular carrier frequency to the other carrier frequency.

Further, the non-transitory data storage 410 may hold reference data 414 for use in accordance with the present methods, such as wireless performance measurements. In some examples, the processing unit 408 and the non-transitory data storage 410 could be provided as any combination of hardware, firmware, and/or software.

The processing unit 408 programmed with the programming instructions 412 may define part of the controller 404 or the entire controller for controlling operation of the base station 400. Alternatively or additionally, however, such control functionality could be provided external to the base station 400 in another RAN entity such as a base station controller, mobile switching center, serving gateway, radio network controller, and mobility management entity, for instance, which could be communicatively linked with the base station 400 and could serve to control aspects of base station operation and RAN operation generally.

Figure 5:
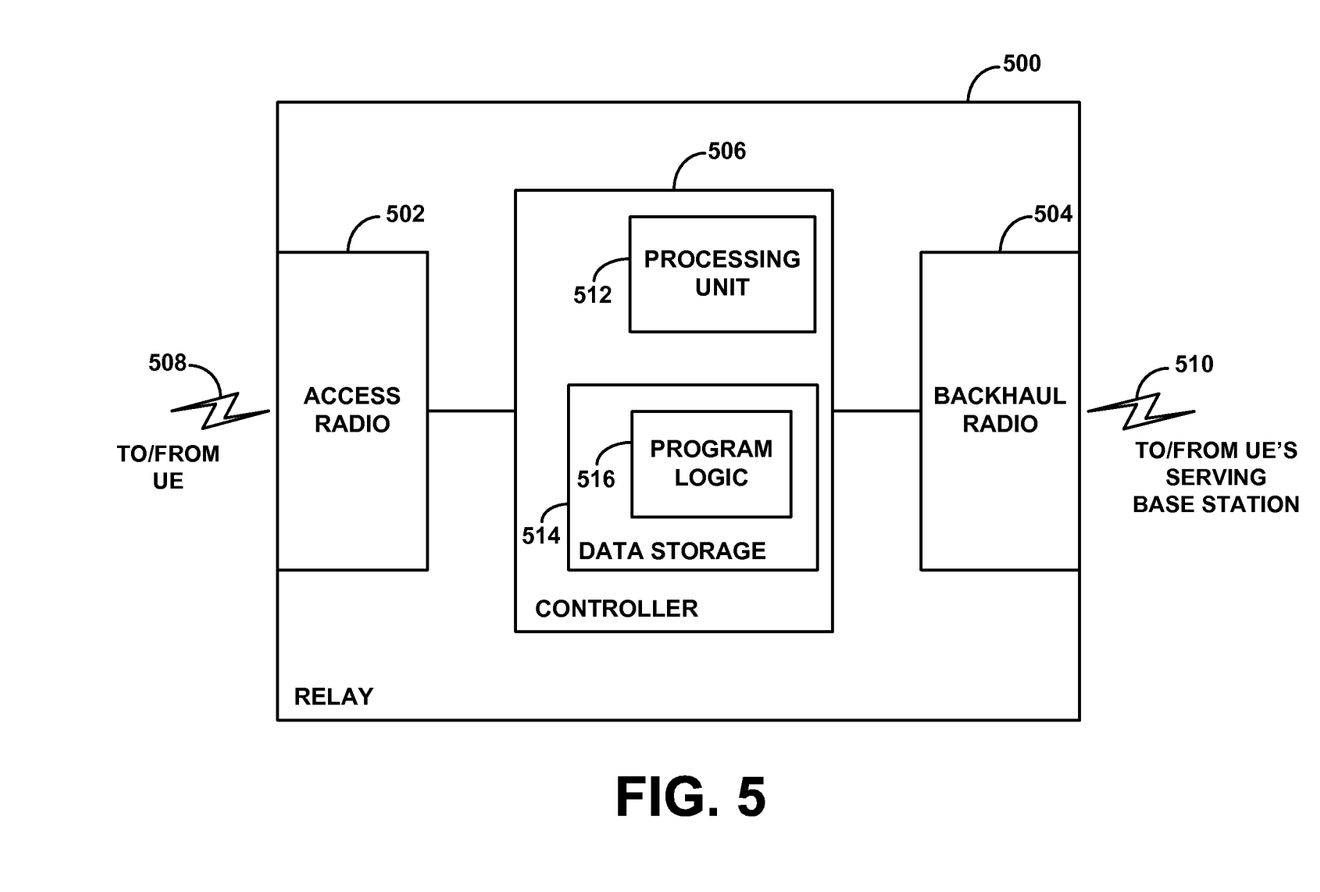
FIG. 5 is a simplified block diagram of a representative relay arranged to implement aspects of the present method.

Finally, FIG. 5 is a simplified block diagram of a representative relay 500 arranged to implement aspects and processes of the present method described above. As shown, the relay 500 includes an access radio 502, a backhaul radio 504, and a controller 506 for bridging communications between the access radio 502 and the backhaul radio 504.

Although FIG. 5 depicts these components as discrete blocks, the components may be integrated together in various ways or provided in other forms. For instance, the backhaul access radio 502 and the backhaul radio 504 may be integrated together, perhaps on a single chipset. Further, the controller 506 may be integrated with either or both of the wireless interfaces. Still further, although FIG. 5 depicts the controller 506 with direct links to each of the wireless interfaces, in an alternative arrangement the relay 500 may include a system bus, network, or other connection mechanism to which the wireless interfaces and controller may be communicatively linked. Other arrangements are possible as well.

In line with the discussion above, the access radio 502 may function to engage in wireless communication with the UE on the access interface frequency over an access air interface 508. To facilitate this, the access radio 502 may be largely the same type of radio/interface that would be included in a base station designed to serve the UE. The access radio 502 may thus include an antenna arrangement (not shown), power amplifier (not shown), and associated components to facilitate transmitting and receiving bearer and control data in communication with the UE.

The backhaul radio 504, on the other hand, may function to engage in wireless communication with the UE's serving base station on the backhaul interface frequency over a backhaul air interface 510. To facilitate this, the backhaul radio 504 may be largely the same type of radio/interface that would be included in a UE designed to be served by a base station. The backhaul radio 504 may thus include an antenna arrangement (not shown), power amplifier (not shown), and associated components to facilitate transmitting and receiving bearer and control data in communication with the UE's serving base station.

In line with the discussion above, the controller 506, in turn, may function to actively bridge communications of the access radio 502 with communications of the backhaul radio 504, and thus to bridge access wireless communications between the UE's serving base station and the relay 500 with backhaul wireless communications between the relay 500 and the UE. As such, as the access radio 502 receives uplink communications from the UE, the controller 506 may receive those communications from the access radio 502. Upon receipt of the uplink communications, the controller 506 may pass those communications to the backhaul radio 504, and the backhaul radio 504 may then transmit those communications to the UE's serving base station. Likewise, as the backhaul radio 504 receives downlink communications from the UE's serving base station, the controller 506 may receive those communications from the backhaul radio 504. Upon receipt of the downlink communications, the controller 506 may pass those communications to the access radio 502, and the access radio 502 may then transmit those communications to the UE.

In the example arrangement shown, the controller 506 includes a processing unit 512 and data storage 514. The processing unit 512 may comprise one or more general purpose processors (e.g., microprocessors) and/or one or more special purpose processors (e.g., digital signal processors and/or application specific integrated circuits). And the data storage 514 may comprise one or more volatile and/or non-volatile storage components, such as magnetic, optical, flash, or other types of non-transitory computer readable media, and may be integrated in whole or in part with the processing unit 512.

As shown, the data storage 514 may store program logic (e.g., machine language instructions) 516, which may be executable by the processing unit 512 to carry out various relay functions described herein such as facilitating communication between the UE and the UE's serving base station.

While various aspects have been disclosed herein, other aspects will be apparent to those skilled in the art. The various aspects disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. In a radio access network (RAN) that includes a plurality of base stations that radiate to define respective wireless coverage areas, each wireless coverage area operating on one or more carrier frequencies, a method comprising:

the RAN receiving, from a user equipment device (UE) that is being served by a base station of the RAN on a first carrier frequency, a report indicating threshold low wireless performance on the first carrier frequency; and responsive to the report indicating threshold low wireless performance on the first carrier frequency, the RAN activating a relay that functions to (i) communicate with the base station over a relay backhaul interface, and (ii) serve the UE on a second carrier frequency that is different from the first carrier frequency, wherein the RAN activating the relay comprises: (a) the RAN determining locations of one or more inactive relays, (b) the RAN determining a location of the UE, (c) based on a comparison of the locations of the one or more inactive relays with the location of the UE, the RAN selecting, to be the relay, a particular relay from the one or more inactive relays that is closest to the location of the UE, (d) the RAN activating the selected relay as the relay, and (e) the RAN transmitting to the relay a directive to serve the UE on the second carrier frequency.

2. The method of claim 1, further comprising the RAN transmitting to the relay a directive to communicate with the base station over the relay backhaul interface on the first carrier frequency.

3. The method of claim 1, further comprising the RAN transmitting to the relay a directive to communicate with the base station over the relay backhaul interface on a third carrier frequency that is different from the first carrier frequency and different from the second carrier frequency.

4. The method of claim 1, wherein at least the receiving and activating are performed by the base station.

5. The method of claim 1, further comprising:

the RAN transmitting to the UE a directive for the UE to be served by the relay, wherein the directive includes instructions for the UE to hand off from the first carrier frequency to the second carrier frequency so as to cause the UE to be served by the relay.

6. The method of claim 5, further comprising:

responsive to the UE being served by the relay, the RAN (i) communicating to the UE via the relay, and (ii) receiving communication from the UE via the relay.

7. The method of claim 5, wherein the transmitting is performed by the RAN responsive to the second carrier frequency having sufficiently stronger wireless performance than the first carrier frequency.

8. The method of claim 1, wherein the threshold low wireless performance on the first carrier frequency comprises a threshold low signal-to-noise ratio on the first carrier frequency.

9. The method of claim 8, wherein the threshold low signal-to-noise ratio on the first carrier frequency is a threshold low signal-to-noise ratio as measured by the UE.

10. The method of claim 1, wherein the RAN activating the selected relay as the relay and the RAN transmitting to the relay a directive to serve the UE on the second carrier frequency comprises:

the RAN transmitting to the selected relay activation instructions to direct the relay to serve the UE on the second carrier frequency.

11. A base station comprising:
an antenna structure configured to communicate over an air interface with user equipment devices (UEs) served by the base station; and
a controller,
wherein the controller is configured to receive, via the antenna structure from a given UE that is being served by the base station on a first carrier frequency over the air interface, a report indicating threshold low air interface performance on the first carrier frequency, and responsive to the report indicating threshold low air interface performance on the first carrier frequency, activate a relay that functions to (i) communicate with the base station over a relay backhaul interface, and (ii) serve the UE over a relay access interface on a second carrier frequency that is different from the first carrier frequency, wherein activating the relay comprises: (a) determining locations of one or more inactive relays, (b) determining a location of the UE, (c) based on a comparison of the locations of the one or more inactive relays with the location of the UE, selecting, to be the relay, a particular relay from the one or more inactive relays that is closest to the location of the UE, (d) activating the selected relay as the relay, and (e) transmitting to the relay, via the antenna structure, a directive to serve the UE over the relay access interface on the second carrier frequency.

12. The base station of claim 11, wherein the controller is further configured to transmit to the UE, via the antenna structure, an inter-frequency handoff directive for the UE to hand off from the first carrier frequency to the second carrier frequency operated by the relay, wherein the relay then serves the UE.

13. The base station of claim 11, wherein the report includes a measurement performed by the UE of a signal-to-noise ratio on the first carrier frequency.

14. The base station of claim 11, wherein the controller activating the relay further comprises the controller transmitting to the relay, via the antenna structure, instructions to communicate with the base station over the relay backhaul interface on the first carrier frequency.

15. The base station of claim 11, wherein the antenna structure is configured to communicate over the air interface in accordance with a Long-Term Evolution (LTE) air interface protocol.

16. The base station of claim 11, wherein the controller is further configured to communicate to the UE via the antenna structure and via the relay, responsive to the controller activating the relay.

17. A non-transitory computer-readable medium having stored thereon program instructions executable by a processing unit of a radio access network (RAN) to cause the RAN to perform functions, the RAN including a plurality of base stations that radiate to define respective wireless coverage areas, each wireless coverage area operating on one or more carrier frequencies, the functions comprising:
receiving, from a user equipment device (UE) that is being served by a base station of the RAN on a first carrier frequency, a report indicative of threshold low wireless performance on the first carrier frequency; and
responsive to the report indicating threshold low wireless performance on the first carrier frequency, activating a relay that functions to (i) communicate with the base station over a relay backhaul interface, and (ii) serve the UE on a second carrier frequency that is different from the first carrier frequency, wherein activating the relay comprises: (a) determining locations of one or more inactive relays, (b) determining a location of the UE, (c) based on a comparison of the locations of the one or more inactive relays with the location of the UE, selecting, to be the relay, a particular relay from the one or more inactive relays that is closest to the location of the UE, (d) activating the selected relay as the relay, and (e) transmitting to the relay a directive to serve the UE on the second carrier frequency.

18. The non-transitory computer-readable medium of claim 17, wherein the functions further comprise:
transmitting to the relay a directive to communicate with the base station over the relay backhaul interface on a given carrier frequency that is different from the second carrier frequency.

19. The non-transitory computer-readable medium of claim 18, wherein activating the relay further comprises transmitting to the relay a directive for the relay to operate on the second carrier frequency, and wherein the functions further comprise:
transmitting to the UE a directive for the UE to be served by the relay, wherein the directive includes instructions for the UE to hand off from the first carrier frequency to the second carrier frequency so as to communicate with the relay.

20. The non-transitory computer-readable medium of claim 17, wherein the functions further comprise:
responsive to the UE being served by the relay, communicating to the UE via the relay.

* * * * *